(12) United States Patent
Kumar et al.

(10) Patent No.: US 12,164,538 B2
(45) Date of Patent: Dec. 10, 2024

(54) SYSTEM AND METHOD FOR DATA WAREHOUSE WORKLOAD TRANSFORMATION

(71) Applicant: DATAMETICA SOLUTIONS PRIVATE LIMITED, Pune (IN)

(72) Inventors: Niraj Kumar, Pune (IN); Abbas Gadhia, Pune (IN); Sudhir Singh, Pune (IN)

(73) Assignee: DATAMETICA SOLUTIONS PRIVATE LIMITED (IN)

( * ) Notice: Subject to any disclaimer, the term of this patent is extended or adjusted under 35 U.S.C. 154(b) by 0 days.

(21) Appl. No.: 17/810,851

(22) Filed: Jul. 6, 2022

(65) Prior Publication Data

US 2023/0281213 A1   Sep. 7, 2023

(30) Foreign Application Priority Data

Feb. 3, 2022   (IN) .............................. 202221005933

(51) Int. Cl.
G06F 16/25       (2019.01)
G06F 16/2453    (2019.01)

(52) U.S. Cl.
CPC ...... *G06F 16/254* (2019.01); *G06F 16/24542* (2019.01)

(58) Field of Classification Search
CPC .................... G06F 16/254; G06F 16/24542
See application file for complete search history.

(56) References Cited

U.S. PATENT DOCUMENTS

| | | | |
|---|---|---|---|
| 6,604,110 B1 * | 8/2003 | Savage ................. | G06F 16/254 707/999.102 |
| 7,647,298 B2 * | 1/2010 | Adya ................... | G06F 16/2445 707/999.002 |

(Continued)

FOREIGN PATENT DOCUMENTS

| | | |
|---|---|---|
| CN | 109635024 A | 4/2019 |
| CN | 105930361 B | 5/2019 |

OTHER PUBLICATIONS

An algorithm for mapping the relational database to mongodb—a case study. International journal of Computer Science and Applications, 2017.*

(Continued)

*Primary Examiner* — Daniel A Kuddus
(74) *Attorney, Agent, or Firm* — Jason C. Cameron (57) ABSTRACT

A system for data warehouse workload transformation is disclosed. A data extraction module receives job metadata from one or more extract transform load applications, extracts domain logic information from the job metadata. A canonical model generation module creates one or more relational models from the domain logic information, generates a canonical model for the job metadata by merging the one or more relational models. A model optimization module creates a query execution plan using an optimization technique, passes the canonical model through one or more optimization layers, and optimizes the query execution plan to execute common logic at a single point of time for removing one or more redundant operations. A code generation module generates an output code corresponding to the predefined target environment from an optimized canonical model, upon mapping of the one or more entities, for the workload transformation.

8 Claims, 5 Drawing Sheets

(56) References Cited

U.S. PATENT DOCUMENTS

| | | | | |
|---|---|---|---|---|
| 8,024,369 B2* | 9/2011 | Pellegrini | ............. | G06F 9/5038 |
| | | | | 707/758 |
| 8,090,658 B2* | 1/2012 | Seeds | ................. | G06Q 10/0637 |
| | | | | 707/602 |
| 8,364,651 B2* | 1/2013 | Howey | ............. | G06F 16/24556 |
| | | | | 707/810 |
| 2007/0226203 A1* | 9/2007 | Adya | .................. | G06F 16/2445 |
| 2007/0299676 A1* | 12/2007 | Seeds | .................... | G06F 16/283 |
| | | | | 705/1.1 |
| 2008/0262822 A1* | 10/2008 | Hardwick | ........... | G06F 11/3457 |
| | | | | 703/21 |
| 2008/0262823 A1* | 10/2008 | Oslake | ...................... | G06F 8/20 |
| | | | | 703/22 |
| 2008/0262824 A1* | 10/2008 | Oslake | ...................... | G06F 8/20 |
| | | | | 703/22 |
| 2009/0144671 A1* | 6/2009 | Liu | ........................ | G06F 30/39 |
| | | | | 716/132 |
| 2011/0320399 A1* | 12/2011 | Ledwich | ................ | G06Q 10/06 |
| | | | | 707/602 |
| 2012/0296862 A1* | 11/2012 | Duda | .................... | G06F 16/254 |
| | | | | 707/602 |
| 2013/0191555 A1* | 7/2013 | Liu | ......................... | G06F 3/061 |
| | | | | 710/5 |
| 2013/0297557 A1* | 11/2013 | Bhide | .................. | G06F 16/254 |
| | | | | 707/602 |
| 2014/0279838 A1* | 9/2014 | Tsirogiannis | ......... | G06F 16/235 |
| | | | | 707/603 |
| 2016/0314175 A1* | 10/2016 | Dhayapule | .......... | H04L 67/1001 |
| 2019/0265971 A1* | 8/2019 | Behzadi | .................. | H04L 67/61 |
| 2020/0117676 A1* | 4/2020 | Ben Moshe | .......... | G06F 16/254 |
| 2022/0237202 A1* | 7/2022 | Orun | .................... | G06F 16/254 |

OTHER PUBLICATIONS

Stanescu et al., an algorithm for mapping the relational database to mongodb—a case study. International journal of Computer Science and Applications, 2017.*

Ashish Trivedi, Mapping Relational Databases and SQL to MongoDB, Feb. 6, 2014.

* cited by examiner

SYSTEM AND METHOD FOR DATA WAREHOUSE WORKLOAD TRANSFORMATION

EARLIEST PRIORITY DATE

This International Application claims priority from a complete patent application filed in India having Patent Application No. 202221005933, filed on Feb. 3, 2022 and titled "SYSTEM AND METHOD FOR DATA WAREHOUSE WORKLOAD TRANSFORMATION".

BACKGROUND

Embodiments of the present disclosure relate to a data migration process and more particularly to a system and a method for data warehouse workload transformation.

Data integration applications or processes typically utilize specialized computer programs that perform data movement and transformations between data assets like databases, data files etc. Such data integration applications are implemented using ETL (Extract, Transform and Load) which is an architectural pattern of extracting data from one or more sources, applying the transformation logic and load into destination. The process of ETL plays a key role in data integration strategies and thereby allows businesses to gather data from multiple sources and consolidate it into a single, centralized location. Various ETL products are available in the market which are responsible for migration of data from one source to another.

Conventionally, the system available for conversion of ETL jobs from source data warehouse to target system can be done two ways. First one involves changing the target into all ETL mappings to work with new databases. and second to convert all ETL mapping to ELT scripts. However, in the first scenario, conventional systems face a lot of limitations during conversion of ETL jobs as ETL tools need to be compatible with new modern databases or vice versa. In the second scenario, such a conventional system needs to understand a complicated logic during the translation process which is difficult, time consuming and extraction of ETL mappings is complex. Moreover, such a conventional system needs to have prerequisite information about one or more different types of ETL tools thereby creates difficulty in understanding programming stages involved. Furthermore, such a conventional system will have to re-writing the mappings/stages while the underlying data sources are also being migrated. In addition, one or more redundancies gets introduced during the conventional translation process when heterogeneous data sources move to a homogeneous data source which further leads to compatibility issues.

Hence, there is a need for an improved system and a method for data warehouse workload transformation in order to address the aforementioned issues.

BRIEF DESCRIPTION

In accordance with an embodiment of the present disclosure, a system for data warehouse ETL workload transformation is disclosed. The system includes a processing subsystem hosted on a server. The processing subsystem is configured to execute on a network to control bidirectional communications among a plurality of modules. The processing subsystem includes a data extraction module configured to receive job & workflow metadata in one or more formats from one or more extract transform load applications. The data extraction module is also configured to extract domain logic information from the job metadata received. The processing subsystem also includes a canonical model generation module operatively coupled to the data extraction module. The canonical model generation module is configured to create one or more relational models from the domain logic information extracted. The canonical model generation module is also configured to generate a canonical model for the job metadata by merging the one or more relational models created. The processing subsystem also includes a model optimization module operatively coupled to the canonical model creation module. The model optimization module is configured to create a query execution plan using an optimization technique based on the canonical model generated. The model optimization module is also configured to pass the canonical model through one or more optimization layers for identification of one or more common branches involved in the job metadata upon creation of the query execution plan. The model optimization module is also configured to optimize the query execution plan to execute common logic at a single point of time for removing one or more redundant operations. The model optimization module is also configured to map one or more entities associated with the job metadata to one or more target entities associated with a predefined target environment. The processing subsystem also includes a code generation module operatively coupled to the model optimization module and the canonical model generation module, wherein the code generation module is configured to generate an output code corresponding to the predefined target environment from an optimized canonical model, upon mapping of the one or more entities, for the workload transformation.

In accordance with another embodiment of the present disclosure, a method for data warehouse workload transformation is disclosed. The method includes receiving, by a data extraction module of a processing subsystem, job metadata in one or more formats from one or more extract transform load applications. The method also includes extracting, by the data extraction module of the processing subsystem, domain logic information from the job metadata received. The method also includes creating, by a canonical model generation module of the processing subsystem, one or more relational models from the domain logic information extracted. The method also includes generating, by the canonical model generation module of the processing subsystem, a canonical model for the job metadata by merging the one or more relational models created. The method also includes creating, by a model optimization module of the processing subsystem, a query execution plan using an optimization technique based on the canonical model generated. The method also includes passing, by the model optimization module of the processing subsystem, the canonical model through one or more optimization layers for identification of one or more common branches involved in the job metadata upon creation of the query execution plan. The method also includes optimizing, by the model optimization module of the processing subsystem, the query execution plan to execute common logic at a single point of time for removing one or more redundant operations. The method also includes mapping, by the model optimization module of the processing subsystem, one or more entities associated with the job metadata to one or more target entities associated with a predefined target environment. The method also includes generating, by a code generation module of the processing subsystem, an output code corresponding to the predefined target environment from an optimized canonical model, upon mapping of the one or more entities, for the workload transformation.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for data warehouse workload transformation. The system includes a processing subsystem hosted on a server. The processing subsystem is configured to execute on a network to control bidirectional communications among a plurality of modules. The processing subsystem includes a data extraction module configured to receive job metadata in one or more formats from one or more extract transform load applications. The data extraction module is also configured to extract domain logic information from the job metadata received. The processing subsystem also includes a canonical model generation module operatively coupled to the data extraction module. The canonical model generation module is configured to create one or more relational models from the domain logic information extracted. The canonical model generation module is also configured to generate a canonical model for the job metadata by merging the one or more relational models created. The processing subsystem also includes a model optimization module operatively coupled to the canonical model creation module. The model optimization module is configured to create a quey execution plan using an optimization technique based on the canonical model generated. The model optimization module is also configured to pass the canonical model through one or more optimization layers for identification of one or more common branches involved in the job metadata upon creation of the query execution plan. The model optimization module is also configured to optimize the query execution plan to execute common logic at a single point of time for removing one or more redundant operations. The model optimization module is also configured to map one or more entities associated with the job metadata to one or more target entities associated with a predefined target environment. The processing subsystem also includes a code generation module operatively coupled to the model optimization module and the canonical model generation module, wherein the code generation module is configured to generate an output code corresponding to the predefined target environment from an optimized canonical model, upon mapping of the one or more entities, for the workload transformation.

Figure 1:
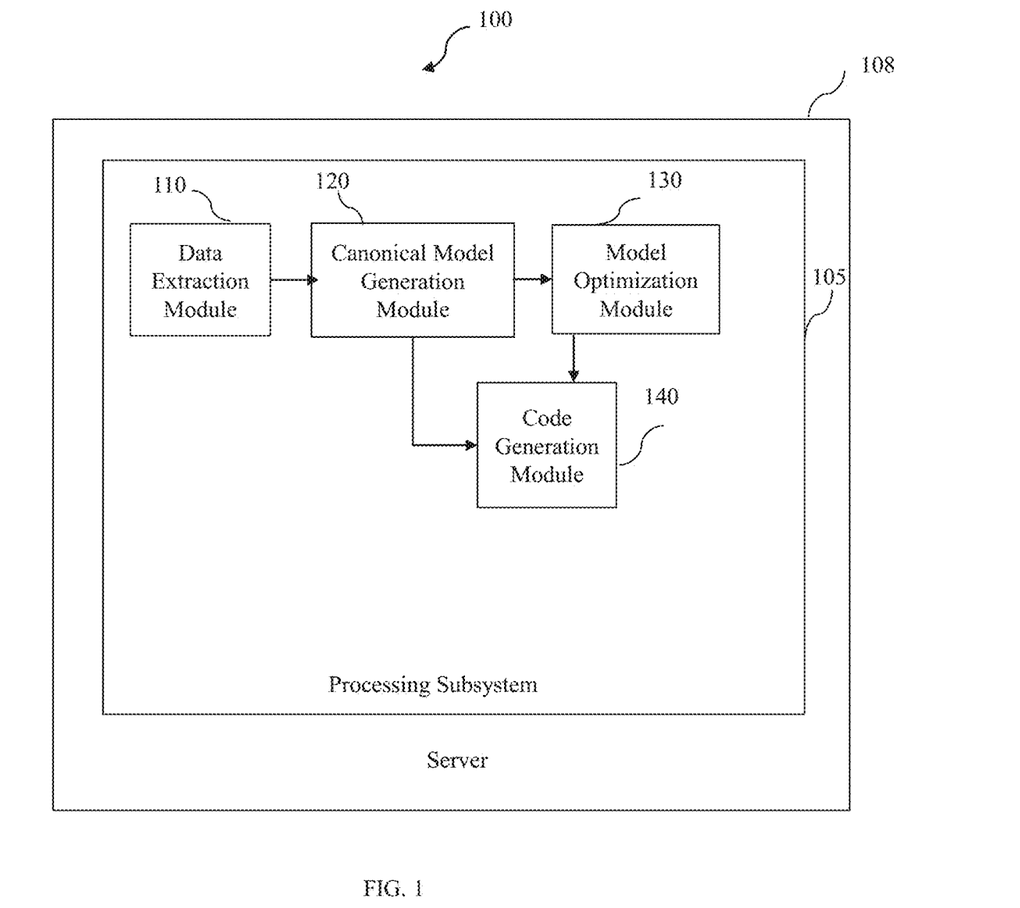
FIG. 1 is a block diagram of a system for data warehouse workload transformation in accordance with an embodiment of the present disclosure.

FIG. 1 is a block diagram of a system 100 for data warehouse workload transformation in accordance with an embodiment of the present disclosure. The system 100 includes a processing subsystem 105 hosted on a server 108. In one embodiment, the server 108 may include a cloud server. In another embodiment, the server 108 may include a local server. The processing subsystem 105 is configured to execute on a network (not shown in FIG. 1) to control bidirectional communications among a plurality of modules. In one embodiment, the network may include a wired network such as local area network (LAN). In another embodiment, the network may include a wireless network such as Wi-Fi, Bluetooth, Zigbee, near field communication (NFC), infra-red communication (RFID) or the like.

The processing subsystem 105 includes a data extraction module (110) configured to receive job metadata in one or more formats from one or more extract transform load applications. As used herein, the term 'metadata' is defined as data about physical and logical data assets as well as the data processing functions and parameters. In one embodiment, the job metadata may include information associated with underlying data asset extracted from the one or more extract transform load (ETL) applications. In some embodiment, the one or more formats may include an extended markup language (XML) format. The one or more extract transform load (ETL) applications include one or more data integration tools for connecting and fetching data from one or more sources on demand. In such embodiment, the one or more ETL applications may include, but not limited to, Informatica PowerCenter™, DataStage™, Oracle data Integrator™, Microsoft SQL server integration Service™, SAP data Service™, Alooma™ and the like. The data extraction module 110 is also configured to extract domain logic information from the job metadata received. Similarly, the term 'domain logic' is defined as a logic with custom rules or techniques that handle the exchange of information between a database and user interface.

The processing subsystem 105 also includes a canonical model generation module operatively coupled to the data extraction module 110. The canonical model generation module 120 is configured to create one or more relational models from the domain logic information extracted. In one embodiment, the one or more relational models are created for representation of embedded structured query language (SQL) queries of the job metadata. The one or more relational models are created for embedded custom SQL in job metadata and the domain business logic implemented in the job. The canonical model generation module 120 is also configured to generate a canonical model for the job metadata by merging the one or more relational models created. The canonical model is generated based on application of a predefined set of formatting rules to the dataset. The canonical model is generated also for database specific user queries. and ETL job transformation which allows it to perform optimization on end-to-end transformation. Generally, database specific user queries are an integral part of the connectors in ETL jobs. These act as inputs which are provided to the system 100 for handling data migration. The canonical model generation module 120 parses the database specific user queries and generates canonical models for them as well which can be translated to any target system. This canonical model of the query is further integrated with the job's canonical model.

Again, the canonical model generation module 120 also handles the one or more custom expressions written in extract transform load (ETL) by having an engine specific expression parser which generates the canonical form of the expression. Not only this, the module also takes advantage of certain operations like predicate pushdown, join pushdown and benefit of—homogeneous systems during data migration from heterogeneous to homogeneous system— Canonical model allows to do below mentioned operation such as lineage aware data model: Since the canonical model represents a complete model of ETL engine including orchestration layer, it makes it possible to analyse complete data lineage starting from orchestrator to a column of a table. Later on, this analysis is used in optimization. The canonical model also performs common branch identification. For example, many data mappings/transformations involve common processing branches which are forked in multiple branches using some router stage. The canonical model generation module 120 also identifies such common branches from canonical model. By creating a separate model for such branches, it avoids duplicate processing in the target system.

The processing subsystem 105 also includes a model optimization module (130) operatively coupled to the canonical model generation module 120. The model optimization module 130 is configured to create a query execution plan using an optimization technique on the canonical model generated. In one embodiment, the optimization technique may include at least one of a predicate pushdown technique, a join pushdown technique, a projection pruning technique or a combination thereof.

Once, the canonical model of the job metadata is generated completely, it is further optimized to remove any redundant operation. Same thing is applied to the canonical model for an expression, which is also optimized, and any redundant operation is removed to gain performance improvement in the target system. The model optimization module 130 is also configured to pass the canonical model through one or more optimization layers for identification of one or more common branches involved in the job metadata upon creation of the query execution plan.

The model optimization module 130 is also configured to optimize the query execution plan to execute common logic at a single point of time for removing the one or more redundant operations. The canonical model is passed through the one more optimization layer which identifies common branches involved in ETL job and further optimizes the query execution plan to execute common logic once to avoid processing cost. The model optimization module 130 is also configured to map one or more entities associated with the job metadata to one or more target entities associated with a predefined target environment. In one embodiment, the one or more entities associated with the job metadata may include at least one of one or more functions, one or more expressions, one or more programming constructs, one or more dialects or a combination thereof. The model optimization module 130 also optimizes source or target system independent canonical model using a standard and well-defined set of rules. Moreover, new rules can be added as per the target system to capitalize target system specific features. These optimizations are done at two levels such as SQL optimization, expression optimization and workflow optimization In the SQL Optimization, the optimization model uses a set of rules to do optimization as per the dialects involved in the ETL. For example, in a parallel job in DataStage, 3 sources are used, all from different sources viz Oracle™, Teradata™ and Netezza™. If say tables in both Teradata and Netezza are moved to Oracle, optimizer will push all the transformation in Oracle to make use of native database engine. Similarly, it does optimizations whenever it's possible to do filter pushdown, projection pruning, join shuffling, optimization based on the metadata etc.

Again, in case of the expression optimization, complex expressions written for a job are easy to optimize with canonical model. It removes any redundant operation and makes use of expression reusability by pushing common expressions in subquery.

Further, in case of the workflow optimization, since the canonical model captures complete lineage starting from the orchestration layer, it sees all small/redundant jobs and based on complexity merges it into a single operation. For example, if a DataStage job JOB1 loads data from a table and after some validation writes it to a DataSet. Later on, the same DataSet is used in another job JOB2 as a source for further processing. In such cases, 2 relational models are created, one for each job. In the optimization phase, optimizer realises that both can be merged in a single relational model as JOB1 is a simple job and avoids additional steps. Once a complete optimization model of the job is created, the system identifies forking points in the data processing pipeline. These forks are taken care in such a way that common pipeline gets executed once and utilized multiple time. Implementation of the forking mechanism is handled using either programming language or via some orchestration tool, depending on the requirement.

The processing subsystem 105 also includes a code generation module 140 operatively coupled to the model optimization module 130 and the canonical model generation module 120. The code generation module 140 is configured to generate an output code corresponding to the predefined target environment from an optimized canonical model, upon mapping of the one or more entities, for the workload transformation. In a specific embodiment, the output code may include a pure SQL with a light layer of programming language or orchestration tool. In such embodiment, the SQL code is generated by passing through a translation layer in which syntactical differences, native database conversion as well as several formatting issues are handled. The SQL code which is generated after translation encapsulates all the processing involved in the data mapping pipeline. These SQLs are also optimized as per the target environment to take full advantage of a target query processing engine.

The code generation phase is further divided into following steps such as target system specific optimization in which code generators are target specific and have another level of optimizer. Since this optimizer is target aware, it makes use of all the features provided by the target system.

In case of maintainable vs optimized code generation, for a given relational model code generator can produce either small modular scripts which are easy to test and validate one monolithic script for better performance. Based on a configurable score provided by the user, the code generator can produce code for any of the extremes mentioned above or can take a middle path which is modular as well as performant.

In case of Artifact writer step, one or more artifacts are generated as per the specified target environment. This step uses a default setting to generate pretty scripts which can be further configured as per user's preference and requirement.

Figure 2:
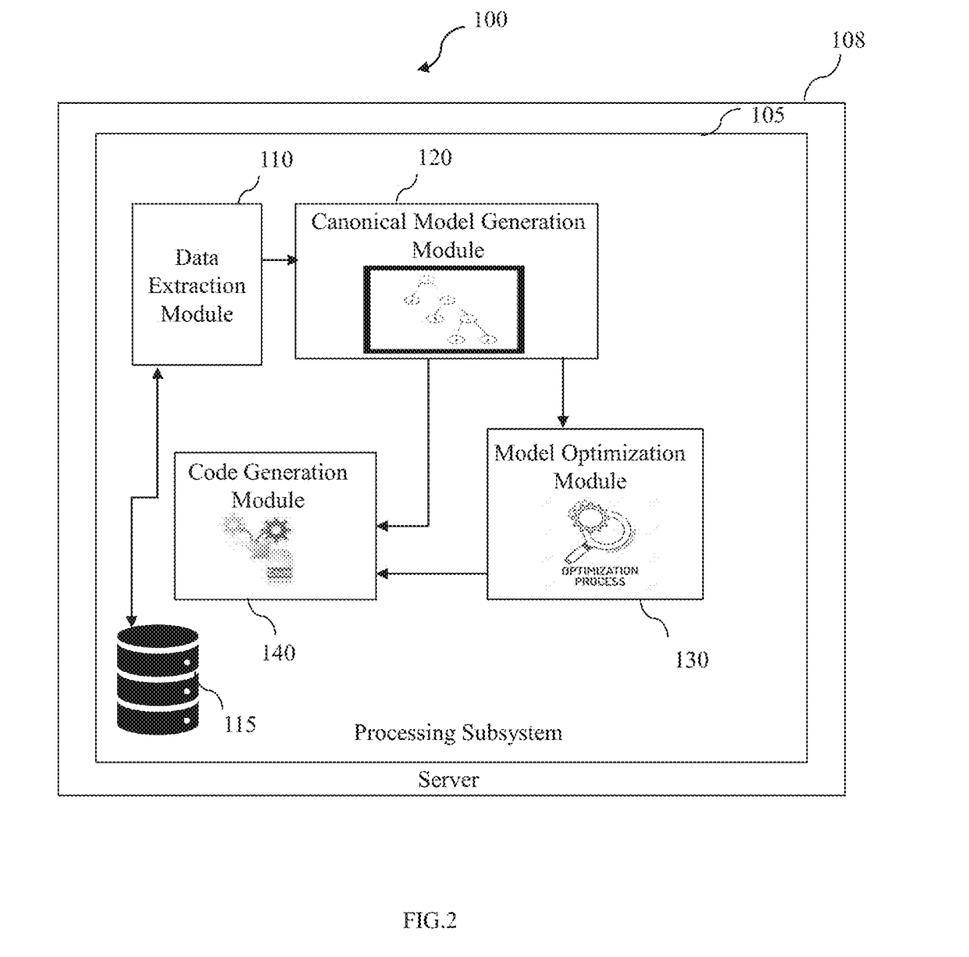
FIG. 2 illustrates a schematic representation of an exemplary embodiment of a system for data warehouse workload transformation of FIG. 1 in accordance with an embodiment of the present disclosure.

FIG. 2 illustrates a schematic representation of an exemplary embodiment of a system 100 for data warehouse workload transformation of FIG. 1 in accordance with an embodiment of the present disclosure. Considering the foregoing description of the features of the system FIG. 1 which depicts a non-limiting example. In such an example, let us assume that an enterprise wants to migrate its data warehouses from a source database to a destination database. In such a scenario, extract transform load (ETL) jobs needs one or more changes as per the destination database. For handling the migration process, the system 100 is utilized which includes a processing subsystem 105, wherein the processing subsystem 105 includes a data extraction module 110 configured to receive job metadata in one or more formats from one or more extract transform load (ETL) applications 115. In the example used herein, the ETL application utilized is DataStage. From such ETL application, the job metadata is received in XML format. Based on the job metadata received, the data extraction module 110 also extracts domain logic information.

Again, upon extraction of the domain logic information, a canonical model generation module 120 create one or more relational models. For example, the one or more relational models are created for representation of embedded structured query language (SQL) queries of the job metadata. The one or more relational models are created for embedded custom SQL in job metadata and the domain logic implemented in the job. The canonical model generation module 120 is also configured to generate a canonical model for the job metadata by merging the one or more relational models created. Here, the canonical model is generated based on application of a predefined set of formatting rules to dataset. The canonical model is generated for both user queries and ETL job transformation which allows it to perform optimization on end-to-end transformation.

Once, the canonical model generation is completed, a model optimization module 120 creates a quey execution plan using an optimization technique. For example, the optimization technique may include at least one of a predicate pushdown technique, a join pushdown technique, a projection pruning technique or a combination thereof.

Further, the model optimization module 130 is also configured to pass the canonical model through one or more optimization layers for identification of one or more common branches involved in the job metadata upon creation of the query execution plan. The model optimization module 130 also optimizes the query execution plan to execute common logic at a single point of time for removing the one or more redundant operations. The canonical model is passed through the one more optimization layer which identifies common branches involved in ETL job and further optimizes the query execution plan to execute common logic once to avoid processing cost. The model optimization module 130 is also configured to map one or more entities associated with the job metadata to one or more target entities associated with a predefined target environment. In one embodiment, the one or more entities associated with the job metadata may include at least one of one or more functions, one or more expressions, one or more programming constructs, one or more dialects or a combination thereof. The model optimization module 130 also optimizes source or target system independent canonical model using a standard and well-defined set of rules. Moreover, new rules can be added as per the target system to capitalize target system specific features. These optimizations are done at two levels such as SQL optimization, expression optimization and workflow optimization.

In the SQL Optimization, the optimization model uses a set of rules to do optimization as per the dialects involved in the ETL. For example, in a parallel job in DataStage, 3 sources are used, all from different sources viz Oracle™, Teradata™ and Netezza™. If say tables in both Teradata and Netezza are moved to Oracle, optimizer will push all the transformation in Oracle to make use of native database engine. Similarly, it does optimizations whenever it's possible to do filter pushdown, projection pruning, join shuffling, optimization based on the metadata etc.

Again, in case of the expression optimization, complex expressions written for a job are easy to optimize with canonical model. It removes any redundant operation and makes use of expression reusability by pushing common expressions in subquery.

Further, in case of the workflow optimization, since the canonical model captures complete lineage starting from the orchestration layer, it sees all small/redundant jobs and based on complexity merges it into a single operation. In the example used herein, if a DataStage job JOB1 loads data from a table and after some validation writes it to a DataSet. Later on, the same DataSet is used in another job JOB2 as a source for further processing. In such cases, 2 relational models are created, one for each job. In the optimization phase, optimizer realises that both can be merged in a single relational model as JOB1 is a simple job and avoids additional steps.

Further, upon mapping of the one or more entities for the workload transformation, a code generation module 140 generates an output code corresponding to the predefined target environment from an optimized canonical model. For example, the output code may include a pure SQL with a light layer of programming language or orchestration tool. In such an example, the SQL code is generated by passing through a translation layer in which syntactical differences, native database conversion as well as several formatting issues are handled. The code generation is further divided into following steps such as target system specific optimization, maintainable vs optimized code generation and artifact writer step for generating the output code corresponding to the target environment. Thus, the system 100 assists in auto-conversion of ETL workloads into destination environment into appropriate format such as SQL with a simple button click for making the process faster and also keeps all the functionality of the job intact.

Figure 3:
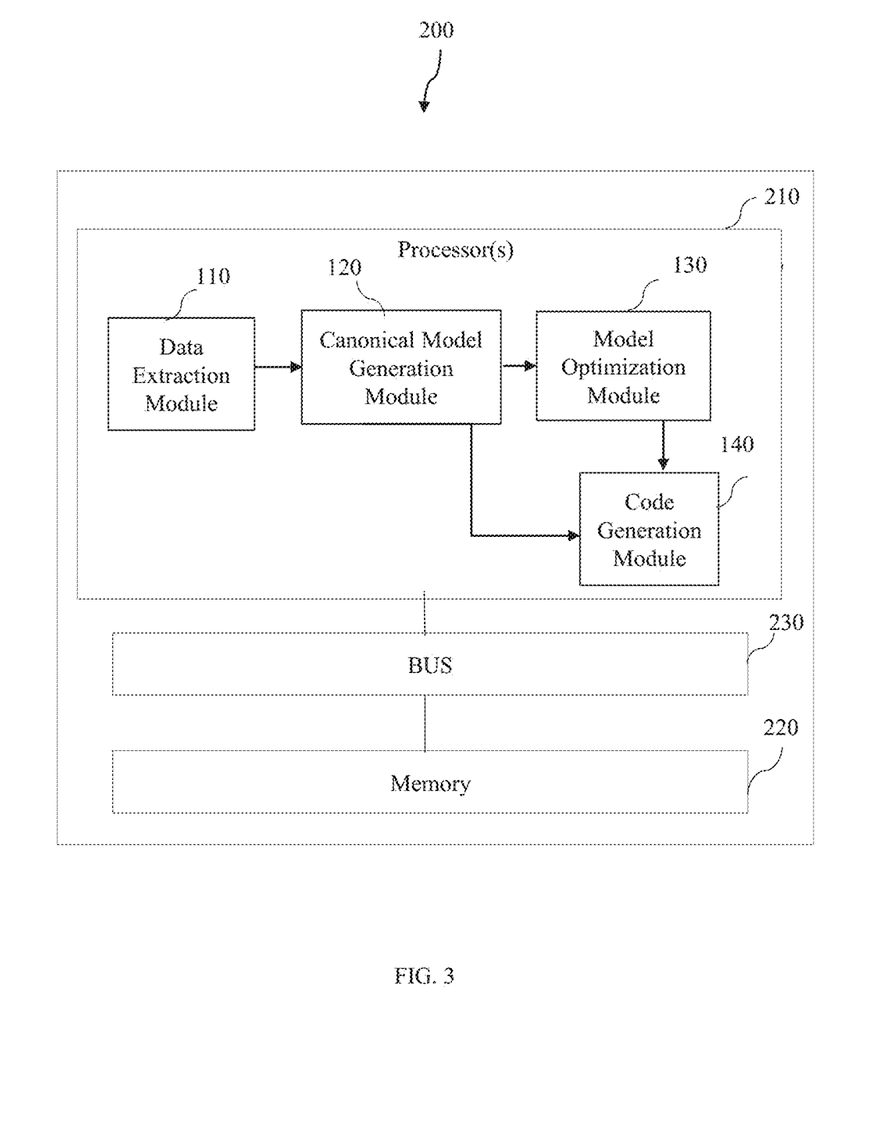
FIG. 3 is a block diagram of a computer or a server in accordance with an embodiment of the present disclosure.

FIG. 3 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory 210 includes a processing subsystem 105 of FIG. 1. The processing subsystem 105 further has following modules: a job metadata module 110, a canonical model generation module 120, a model optimization module 130, a code generation module 140 and a migration handling module 150.

The data extraction module 110 configured to receive job metadata in one or more formats from one or more extract transform load applications. The data extraction module 110 is also configured to extract domain logic information from the job metadata received. The canonical model generation module 120 is configured to create one or more relational models from the domain logic information extracted. The canonical model generation module 120 is also configured to generate a canonical model for the job metadata by merging the one or more relational models created. The model optimization module 130 is configured to create a quey execution plan using an optimization technique based on the canonical model generated. The model optimization module 130 is also configured to pass the canonical model through one or more optimization layers for identification of one or more common branches involved in the job metadata upon creation of the query execution plan. The model optimization module 130 is also configured to optimize the query execution plan to execute common logic at a single point of time for removing one or more redundant operations. The model optimization module 130 is also configured to map one or more entities associated with the job metadata to one or more target entities associated with a predefined target environment. The code generation module 140 is configured to generate an output code corresponding to the predefined target environment from an optimized canonical model, upon mapping of the one or more entities, for the workload transformation.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus and the like.

Figure 4A:
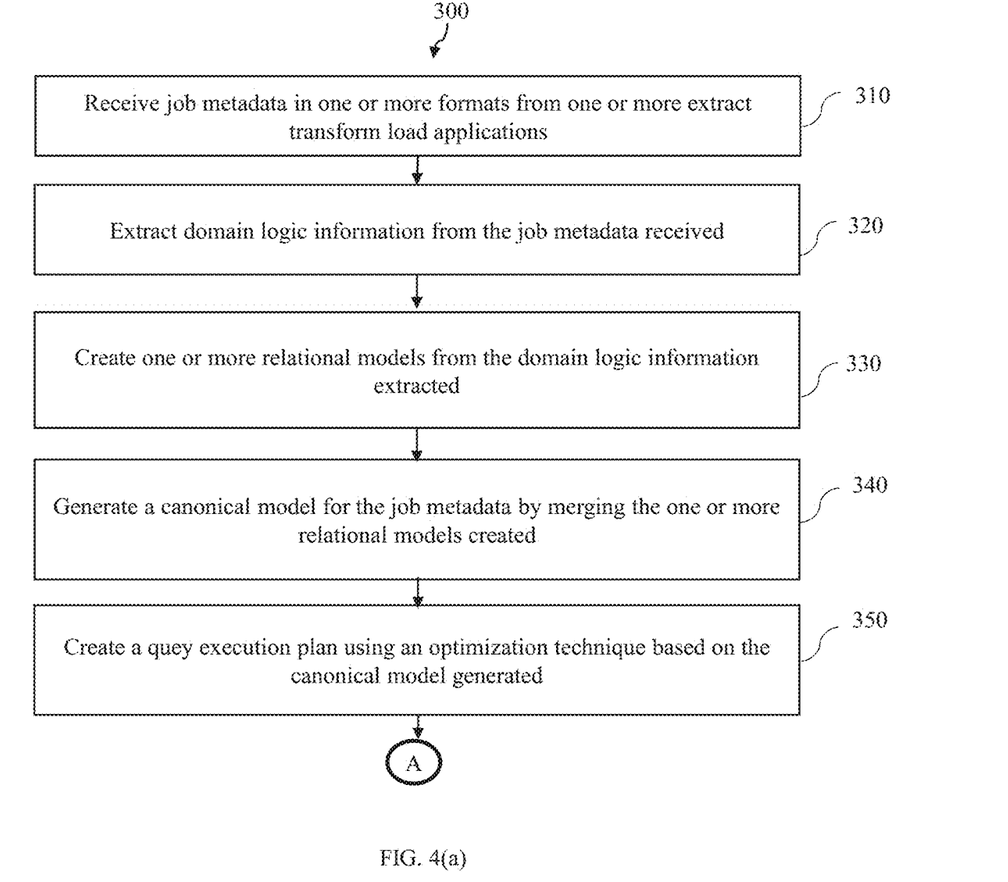
FIG. 4(a) is a flow chart representing the steps involved in a method for data warehouse workload transformation of FIG. 1 in accordance with the embodiment of the present disclosure.
Figure 4B:
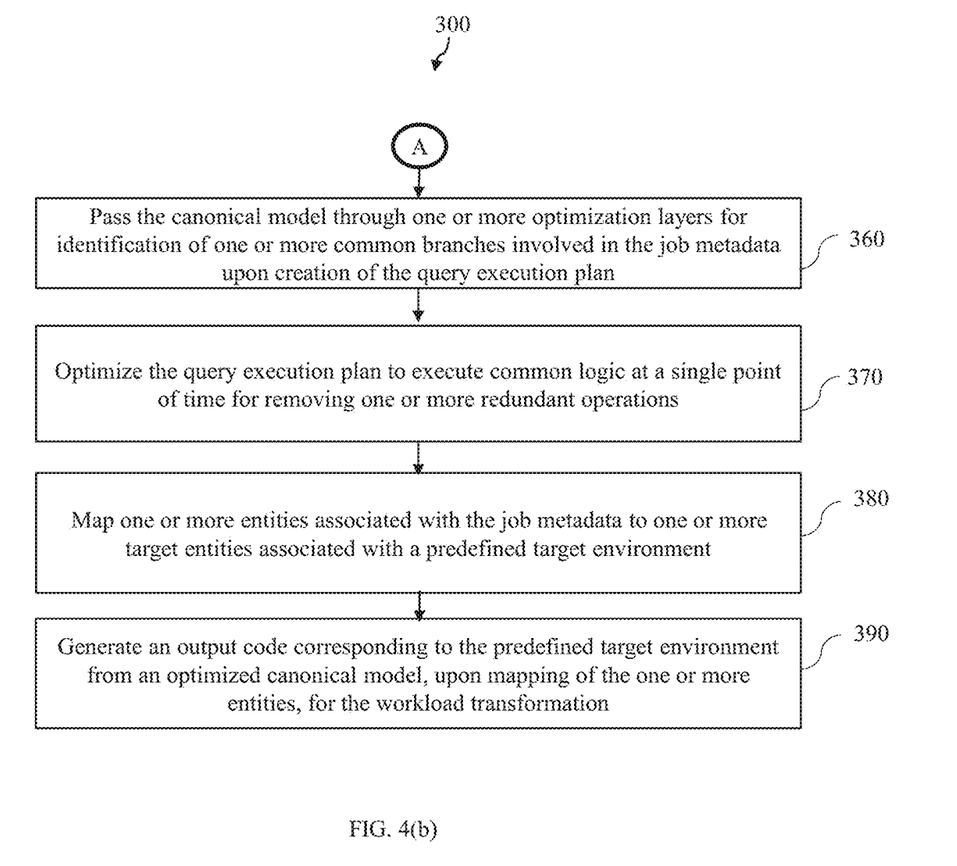
FIG. 4(b) is a flow chart representing the continued steps of method of FIG. 4(a) in accordance with the embodiment of the present disclosure.

FIG. 4 (a) is a flow chart representing the steps involved in a method 300 for data warehouse workload transformation of FIG. 1 in accordance with the embodiment of the present disclosure. FIG. 4(b) is a flow chart representing the continued steps of method of FIG. 4(a) in accordance with the embodiment of the present disclosure. The method 300 includes receiving, by a data extraction module of a processing subsystem, job metadata in one or more formats from one or more extract transform load applications in step 310. In one embodiment, receiving the job metadata in the one or more formats from the one or more extract transform load operations may include receiving the job information associated with underlying data asset extracted from the one or more extract transform load (ETL) applications. In some embodiment, the one or more formats may include an extended markup language (XML) format.

The method 300 also includes extracting, by the data extraction module of the processing subsystem, domain logic information from the job metadata received in step 320. In one embodiment, extracting the domain logic information from the job metadata received from the one or more ETL applications may include extracting the domain logic information from the job metadata received from the one or more ETL applications including, but not limited to, Informatica PowerCenter™, DataStage™, Oracle data Integrator™, Microsoft SQL server integration Service™, SAP data Service™, Alooma™ and the like.

The method 300 also includes creating, by a canonical model generation module of the processing subsystem, one or more relational models from the domain logic information extracted in step 330. In some embodiments, creating the one or more relational models from the domain logic information extracted may include creating the one or more relational models for representation of embedded structured query language (SQL) queries of the job metadata. The one or more relational models are created for embedded custom SQL in job metadata and the domain logic implemented in the job. The method 300 also includes generating, by the canonical model generation module of the processing subsystem, a canonical model for the job metadata by merging the one or more relational models created in step 340.

The method 300 also includes creating, by a model optimization module of the processing subsystem, a query execution plan using an optimization technique based on the canonical model generated in step 350. In one embodiment, creating the query execution plan using the optimization technique may include creating the query execution plan using at least one of a predicate pushdown technique, a join pushdown technique, a projection pruning technique or a combination thereof.

The method 300 also includes passing, by the model optimization module of the processing subsystem, the canonical model through one or more optimization layers for identification of one or more common branches involved in the job metadata upon creation of the query execution plan in step 360. The method 300 also includes optimizing, by the model optimization module of the processing subsystem, the query execution plan to execute common logic at a single point of time for removing one or more redundant operations in step 370.

The method 300 also includes mapping, by the model optimization module of the processing subsystem, one or more entities associated with the job metadata to one or more target entities associated with a predefined target environment in step 380. In some embodiment, mapping the one or more entities associated with the job metadata to the one or more target entities may include mapping at least one of one or more functions, one or more expressions, one or more programming constructs, one or more dialects or a combination thereof.

The method 300 also includes generating, by a code generation module of the processing subsystem, an output code corresponding to the predefined target environment from an optimized canonical model, upon mapping of the one or more entities, for the workload transformation in step 390. In one embodiment, generating the output code corresponding to the predefined target environment from the optimized canonical model may include generating the output code may include a pure SQL with a light layer of programming language or orchestration tool. In such embodiment, the SQL code is generated by passing through a translation layer in which syntactical differences, native database conversion as well as several formatting issues are handled.

Various embodiments of the present disclosure enables conversion of code for data transformation by following a canonical structure and performs optimizations or modifications as well, as per the destination environment thereby reduces manual effort and tediousness.

Moreover, the canonical structure of the converted code generated by the present disclosed system is ubiquitous. Thus, all the jobs follow a particular standard which is hard to achieve in manual conversion.

Furthermore, conversion of the job is done in a reliable and standard way, hence the migration cycle for ETL jobs is very short, which results in a faster as well as a cost-effective solution.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:
1. A computer implemented system for data warehouse workload transformation comprising:
a hardware processor; and
a memory coupled to the hardware processor, wherein the memory comprises a set of program instructions in the form of a processing subsystem, configured to be executed by the hardware processor, wherein the processing subsystem is hosted on a server and configured to execute on a network to control bidirectional communications among a plurality of modules comprising:
a data extraction module configured to:
receive job metadata in one or more formats from one or more extract transform load applications; and
extract domain logic information from the job metadata received;
a canonical model generation module coupled to the data extraction module, wherein the canonical model generation module is configured to:
create one or more relational models from the domain logic information extracted, wherein the one or more relational models being created represent embedded structured query language (SQL) queries of the job metadata and embedded custom SQL in job metadata and the domain logic information implemented in the job; and
generate a canonical model for the job metadata by merging the one or more relational models created based on application of a predefined set of formatting rules database specific user queries and ETL job transformation;
a model optimization module coupled to the canonical model generation module, wherein the model optimization module is configured to:
create a query execution plan using an optimization technique based on the canonical model generated;
pass the canonical model through one or more optimization layers for identification of one or more common branches involved in the job metadata upon creation of the query execution plan;
optimize the query execution plan to execute common logic at a single point of time for removing one or more redundant operations, wherein the optimization comprises SOL optimization expression optimization and workflow optimization;
identify and optimize source or target system independent of canonical model using a standard and well-defined set of rules, with the capability to add new rules as per the target system to capitalize on target system-specific features,
wherein the SOL optimization comprises use of set of rules as per dialects involved in ETL the expression optimization comprises expression reusability by pushing common expressions in subquery and the workflow optimization comprises merging the one or more redundant operations into a single operation by capturing complete lineage from an orchestration layer using the canonical model; and map one or more entities associated with the job metadata to one or more target entities associated with a predefined target environment; and a code generation module coupled to the model optimization module and the canonical model generation module, wherein the code generation module is configured to generate an output code corresponding to the predefined target environment from an optimized canonical model, upon mapping of the one or more entities, for the workload transformation.

2. The system as claimed in claim 1, wherein the job metadata comprises information associated with underlying data asset extracted from the one or more extract transform load applications.

3. The system as claimed in claim 1, wherein the one or more extract transform load applications comprises one or more data integration tools for connecting and fetching data from one or more sources on demand.

4. The system as claimed in claim 1, wherein the one or more formats comprises an extended markup language format.

5. The system as claimed in claim 1, wherein the one or more relational models are created for representation of embedded structured query language queries of the job metadata.

6. The system as claimed in claim 1, wherein the optimization technique comprises at least one of a predicate pushdown technique, a join pushdown technique, a projection pruning technique or a combination.

7. The system as claimed in claim 1, wherein the one or more entities associated with the job metadata comprises at least one of one or more functions, one or more expressions, one or more programming constructs, one or more dialects or a combination.

8. A computer implemented method comprising:
a hardware processor wherein the hardware processor is:
receiving, by a data extraction module of a processing subsystem, job metadata in one or more formats from one or more extract transform load applications;
extracting, by the data extraction module of the processing subsystem, domain logic information from the job metadata received;
creating, by a canonical model generation module of the processing subsystem, one or more relational models from the domain logic information extracted, wherein the one or more relational models being created represent embedded structured query language (SQL) queries of the job metadata and embedded custom SQL in job metadata and the domain logic information implemented in the job;
generating, by the canonical model generation module of the processing subsystem, a canonical model for the job metadata by merging the one or more relational models created,
creating, by a model optimization module of the processing subsystem, a query execution plan using an optimization technique based on the canonical model generated;
passing, by the model optimization module of the processing subsystem, the canonical model through one or more optimization layers for identification of one or more common branches involved in the job metadata upon creation of the query execution plan;
optimizing, by the model optimization module of the processing subsystem, the query execution plan to execute common logic at a single point of time for removing one or more redundant operations, wherein the optimization comprises SQL optimization, expression optimization and workflow optimization
identifying and optimizing source or target system independent of canonical model using a standard and well-defined set of rules, with the capability to add new rules as per the target system to capitalize on target system-specific features,
wherein the SQL optimization comprises use of set of rules as per dialects involved in ETL the expression optimization comprises expression reusability by pushing common expressions in subquery and the workflow optimization comprises merging the one or more redundant operations into a single operation by capturing complete lineage from an orchestration layer using the canonical model;
mapping, by the model optimization module of the processing subsystem, one or more entities associated with the job metadata to one or more target entities associated with a predefined target environment; and
generating, by a code generation module of the processing subsystem, an output code corresponding to the predefined target environment from an optimized canonical model, upon mapping of the one or more entities, for the workload transformation.

* * * * *